Nov. 11, 1958  R. W. DE LANCEY ET AL  2,860,211
ELECTRIC SWITCHES
Filed Aug. 10, 1956  2 Sheets-Sheet 1
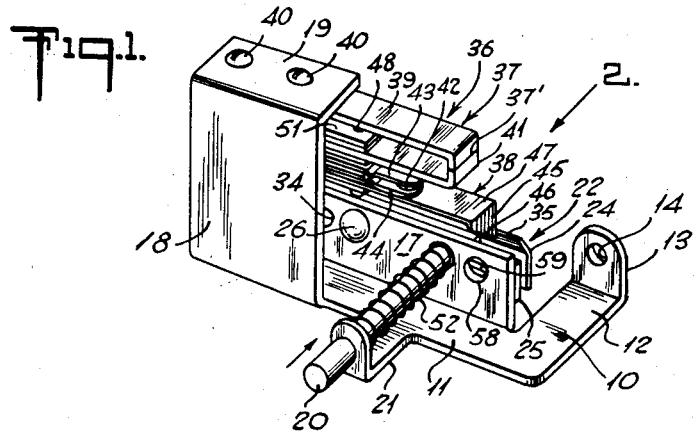
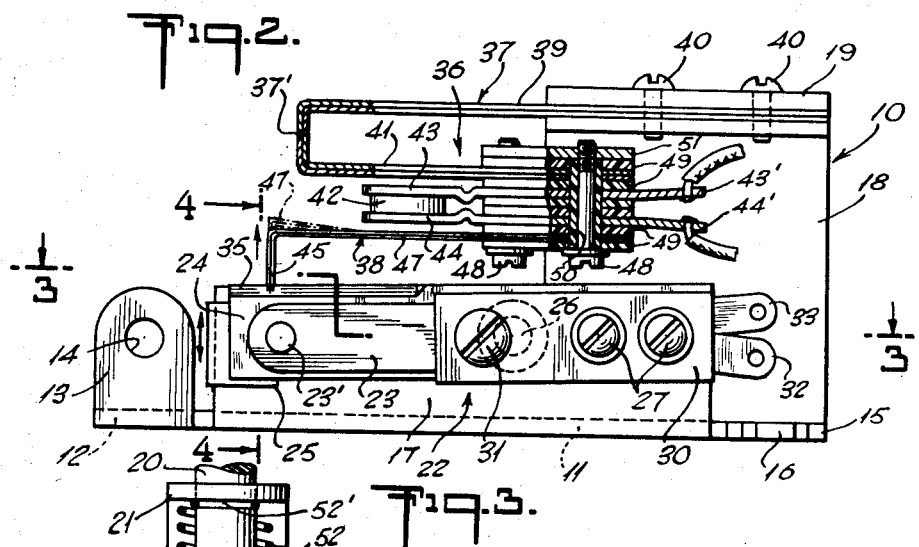
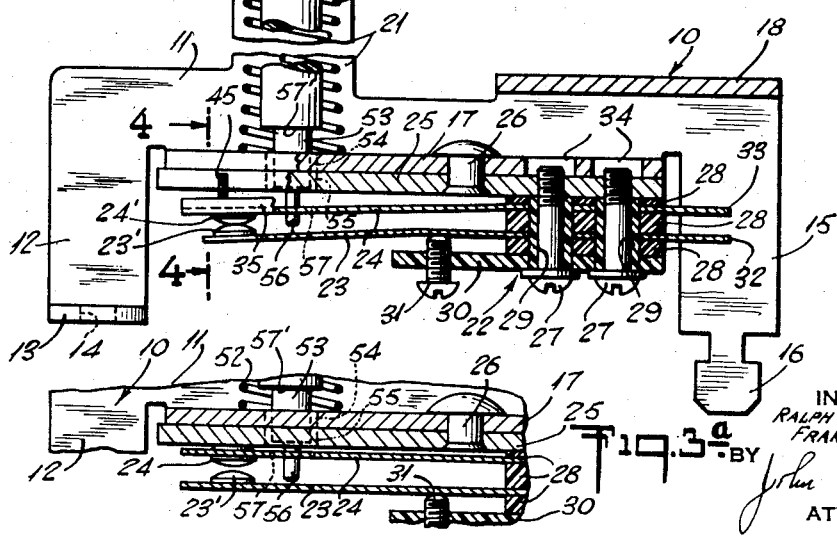
INVENTORS
RALPH W. DE LANCEY
FRANK B. DESIO
BY
ATTORNEY

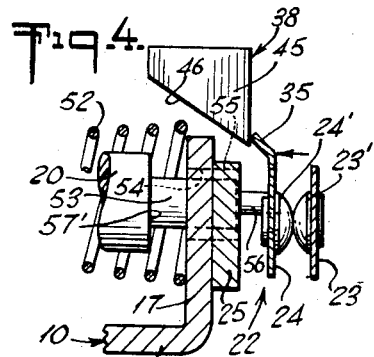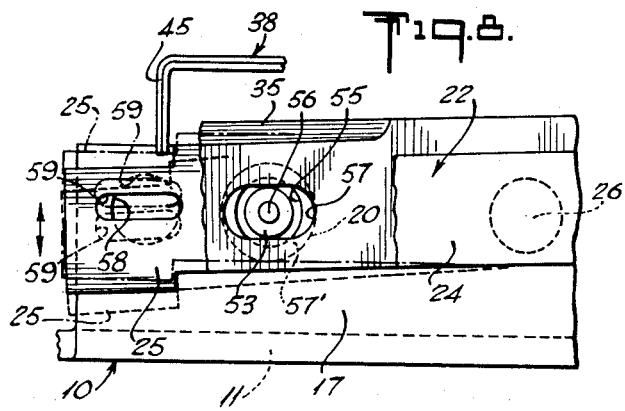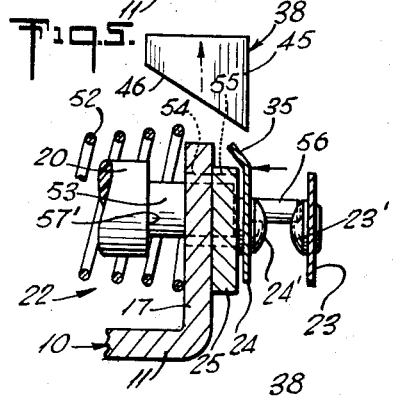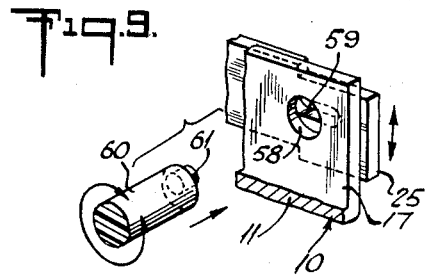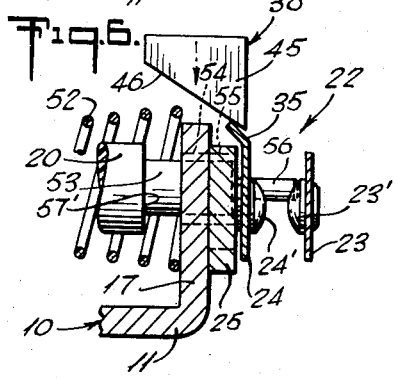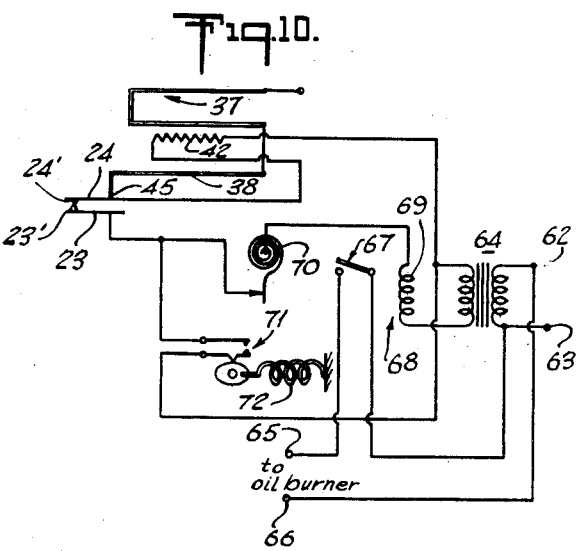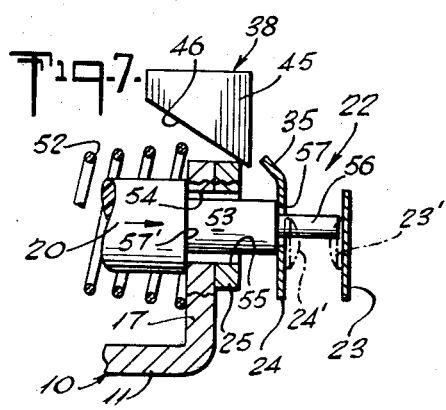

United States Patent Office 2,860,211
Patented Nov. 11, 1958

2,860,211
ELECTRIC SWITCHES

Ralph W. De Lancey, Rockford, and Frank B. Desio, Chicago, Ill., assignors to Controls Company of America, Schiller Park, Ill., a corporation of Delaware Application August 10, 1956, Serial No. 603,268

10 Claims. (Cl. 200—122)

This invention relates to electric switches and, more specifically, to an improved switch responsive to an external condition to break an electric circuit and maintain the circuit in an open condition until manually reset.

One object of the invention resides in the provision of an improved reset switch for automatically controlling an electric circuit in response to both the magnitude and duration of the current flowing therein and is characterized by its dependability, simplicity and ease of adjustment to modify the rapidity with which the switch will respond to a circuit condition. The switch is particularly useful, among other things, as a protective device for oil burning and other similar equipment. In the case of oil burners, for instance, the invention may be arranged to interrupt the electric control circuit of a burner upon failure of the burner to start properly within a predetermined time interval determined by the adjustment of the switch. Upon interruption of the burner control circuit, the switch will remain in the "off" position until manually reset.

Another object of the invention is the provision of a novel and improved reset switch adaptable for use as a protective device on oil burning and other types of equipment wherein the response time of the switch may be quickly and easily modified to meet the requirements of the specific application.

Still another object of the invention is an improved reset switch having positive circuit-breaking action and a relatively high degree of sensitivity, thus insuring uniform and dependable switch operation for extended periods of time.

A still further object of the invention is the provision of a novel and improved reset switch including means for modifying the operating characteristics thereof.

The above and other objects and advantages will become apparent from the following description and accompanying drawings forming part of this application.

The accompanying drawings show, for purposes of illustrating the present invention, one embodiment in which the invention may take form, it being understood that the drawings are illustrative of the invention rather than limiting the same.

In the drawings:

Fig. 1 is a perspective view of one embodiment of the switch in accordance with the invention;

Fig. 2 is a rear elevation of the switch shown in Fig. 1 taken in the direction of the arrow 2, parts being in section;

Fig. 3 is a cross sectional view of the switch taken along the line 3—3 of Fig. 2, with the contacts in reset position;

Fig. 3a is a fragmentary view similar to Fig. 3, showing the contacts in open position;

Fig. 4 through Fig. 7 are fragmentary views of the switch taken along the line 4—4 of Figs. 3 and 3a, Fig. 4 showing the position of the cooperating switch elements with the contacts in the closed position and Figs. 5 through 7 illustrating successive steps in the opening and reclosing of the switch;

Fig. 8 is a fragmentary view, at an enlarged scale, taken in the same direction as Fig. 2 but with a portion of the contacting elements broken away to illustrate an adjustable feature of this switch;

Fig. 9 is a perspective view of certain elements of the switch showing the improved means for effecting adjustment of the switch and a tool for engaging the adjusting means; and Fig. 10 is a circuit diagram illustrating one application of a switch in accordance with the invention.

The switch now to be described, while particularly useful as a protective or reset switch for oil burning equipment, is adaptable for use in other applications requiring the interruption of an electric circuit as a function of the magnitude and duration of the current flowing through the same or other circuit. Therefore, as the current in the circuit being monitored increases, the time delay in the operation of the switch will be decreased. In most applications, however, the current is essentially constant so that the delay interposed by this switch would also be constant. A negative temperature coefficient resistor is employed to heat a bimetallic element so that the rate of generation of the heat will increase with time and insure positive action of the switch. It has been found that, through the use of a heating element of this character, highly uniform and sensitive operation can be obtained for extended periods of time.

In many applications, it is important to modify the operating characteristics of the switch and, for this purpose, novel and improved means for adjusting the switch is provided and affords a wide range of time delays assuming a substantially uniform current.

Referring now to the drawings and, more specifically, to Figs. 1 to 3 thereof, the reset switch, in accordance with the invention, includes a frame member 10 having a flat bottom L-shaped section comprising leg parts 11 and 12. The shorter, rearwardly extending leg 12 has an end portion or foot 13 formed at a right angle to the major part of the leg 12 and includes an opening 14 extending therethrough for the purpose of mounting the switch. For convenience in discussion, it is assumed that the switch is mounted in the position indicated in Figure 1. As gravity is not a factor, it may be mounted in any position.

The other end of the leg 11 has a member 15 (Fig. 3) extending rearwardly in the plane and direction of leg 12. This member is provided with a lug part 16 for engaging a cooperating opening in a mounting panel and functions together with the foot 13 to hold the switch in position on the panel. The frame further includes a flanged portion 17 extending upwardly from the rear edge of the leg 11 for holding the electrical contacting elements forming part of the switch and a bracket member 18 extending upwardly from the front edge of the leg 11 and having a rearwardly bent end part 19 to hold the switch-controlling assembly. A reset button 20 for manually operating the switch is slidably supported between cooperating openings in the bracket part 17 and an L-shaped bracket member 21 extending outwardly from the outer edge of the frame part 11.

The contact assembly, generally denoted by the numeral 22, includes a pair of resilient contact springs or members 23 and 24 carrying cooperating contacts 23' and 24', respectively. These contact-carrying members are carried by an elongated bracket member or bar 25 that lies flat against the rear face of the frame part 17. The bracket 25 is secured to the frame part 17 by a rivet 26 to hold the member in tight frictional engagement with the adjacent face of the bracket part 17 and yet permit angular movement about the axis of the rivet. In order to provide adequate friction between the bar 25 and the frame part 17, to insure its retention in the adjusted position, the bar may be formed with a slight curvature and placed on the frame part 17 with the ends in contact with the frame. The contact-supporting springs 23 and 24 are secured to the right hand side of the bracket member or bar 25 by a pair of screws 27, as illustrated in Fig. 3. The members 23 and 24 are insulated from the movable member 25 and screws 27 by means of three insulating washers 28 and a pair of insulating bushings 29. The contact spring 24 is biased forwardly toward the rear face of bar 25, as indicated in Figures 3a, 5 and 6.

An insulating member 30 overlying the outermost insulator 28 is also held in place by the screws 27 and extends outwardly in overlying relationship to the contact-carrying member 23. The member 30 carries an adjusting screw 31 against which the contact member 23 bears when the switch contact 24' is being held against contact 23'. Electrical connections are made to the contact-carrying members 23 and 24 by means of a pair of lugs 32 and 33 that are preferably formed integrally with the members 23 and 24. In order to avoid interference with the motion of the bar 25 relative to the frame member 17 by reason of the extension of the screws 27 through the bar 25, the member 17 is provided with a pair of openings 34 of substantially greater diameter than the screws so that the desired degree of movement can be obtained.

It will be observed from Figs. 2 and 4 of the drawings that the contact-carrying member 24 is wider than the contact-carrying member 23, and one edge 35 of the contact-carrying member 24 is bent forwardly, as illustrated in Fig. 2 (or to the left, Figs. 4-7), for cooperation with the temperature-responsive contact-controlling means generally denoted by the numeral 36.

The temperature-responsive contact-controlling means 36 includes a pair of bimetallic elements generally denoted by the numerals 37 and 38. The element 37 is in the shape of a U with one leg 39 secured to the flanged portion 19 of the frame 10 by a pair of screws 40. The other leg 41 of the element 37 is somewhat shorter than the leg 39 and functions as a support for the bimetallic element 38, an intervening negative temperature resistor 42 and resistor-supporting brackets 43 and 44.

In order to compensate for ambient changes in temperature, the element 37 is preferably formed of two separate L-shaped bimetallic portions welded one to the other along a line centrally disposed of the transverse portion of the U and denoted generally by the numeral 37'. In this way, the layers of metal forming each part of the element 37 can be reversed so that changes in ambient temperature will not displace the leg 41 of the element 37 relative to the leg 39. In addition, it will be observed that the leg 39 of the element 37 is somewhat longer than the leg 41 and that, by properly arranging the position of each element, substantially complete compensation can be obtained for any displacement of the element 38 due to changes in ambient temperature.

The bimetallic element 38 is of L-shaped construction with the shorter leg 45 being positioned to cooperate with the upper, inclined edge 35 of the contact member 24. The leading edge of this leg 45 is preferably formed with a taper or bevel as shown at 46 in Fig. 1 and Figs. 4 to 7, to prevent interference of the leg 45 with the contact member 24 in the operation of the switch.

The leg 47 of the bimetallic element 38 is secured to the leg 41 of the element 37 by means of a pair of screws 48. The screws 48 also hold the negative temperature co-efficient resistor 42 and cup-shaped metal supporting brackets 43 and 44 in place. These brackets have terminal parts or lugs 43' and 44'. The elements 37 and 38 and bracket members 43 and 44 are insulated one from the others by a series of insulated spacers 49 and insulating sleeves 50 about the screws 48. For convenience, a plate 51 is provided to receive the threaded ends of the screws 48 and avoid the need for individual nuts.

With the arrangement as described above, it is apparent that when an electric current is passed through the resistor 42, the latter will heat the elements 41 and 38. Bimetal 41, when heated, tends to lift the assemblage 36, and element 38 also bends upwardly. Element 38 will thus move away from the contact 24, as shown in dotted position in Fig. 2.

The operation of the switch is illustrated in Figs. 4 through 7, inclusive, and it will be observed that, in the normal closed position of the switch, the pointed end portion of the leg part 45 of element 38 will engage the contact member 24, shifting it rearwardly to hold contact 24' against contact 23'. If a current is passed through the resistor 42, the heat generated thereby will heat the adjoining bimetallic elements, and the leg 45 will move outwardly away from the contact 24, as shown in Fig. 5, and permit the contact-carrying member 24 to move to the left as shown in that figure. Where the current through the resistor 42 is controlled by the contacts 23' and 24', the bimetallic elements will start to cool, and the leg part 45 will move upwardly. Since the contact-carrying member 24 has moved beyond the pointed end part of leg 45 of element 37, upon cooling of the element, the beveled edge 46 will engage the contact-carrying member 24 in the left hand position as shown in Fig. 6. In order to reset the switch, the contact 24 must be forced rearwardly past the pointed end part of the leg 45 of element 38, as shown in Fig. 7, and this is accomplished by the reset button 20 shown in Fig. 1 and other figures.

The reset button is normally held in the outermost position, as shown in Fig. 1, by a spring 52 disposed between the bracket members 21 and 17 and surrounding the push button 20. The outer end of the spring engages a slot 52' in the shaft of the button 20, as shown in Fig. 3, and functions to urge it in the outward direction. The inner end of the button 20 is provided with a portion 53 of reduced diameter that extends through a pair of aligned openings 54 and 55 in the flange 17 and the movable member 25 previously described. The end of the section 53 is provided with a concentrically disposed extension or tip 56 of fairly narrow section. The end section 56 of button 20 extends through an opening 57 in the contact member 24, which opening has a width or diameter somewhat less than the diameter of the cylindrical section 53 of the button. It reaches nearly to the spring 23. When the button 20 is pushed in, the tip 56 engages spring 23 and presses it back against screw 31. Then, the cylindrical section 53 will engage the contact-carrying member 24 and move it rearwardly. The shoulder 57' on the button 20 engages the flange 17 so that the contact springs are not bent too far back. The switch remains open until the button 20 is released, whereupon the contact member 24 will rest on the pointed end part of the leg 45 of the element 38, and the outer contact member 23, while still remaining in engagement with screw 31, will move forwardly into contact relationship with the contacting member 24.

The cooperation of the reset button 20 with the contact-carrying members 23 and 24, as described above, prevents accidental and intentional closure of the contacts and loss of the protective features afforded by the reset switch. Inasmuch as any depression of the button 20 functions to open the contacts 23' and 24', should the button be held in the depressed condition by the operator, an object falling against the button or even through a defect in the switch itself, the control circuit will merely remain open and immobilize the associated oil burner. Once the contacts have been opened by faulty operation of the burner or otherwise, closure of the contacts can only be attained by depression and subsequent release of the button. Thus, the function of the reset switch cannot be overridden.

As will be observed from Figs. 4 through 7, inclusive, the time required for the contact-controlling assembly 36 to move upwardly and release the lower contact member 24 is a function of the position of the tapered edge part of the contact 24 relative to the leg 45 of the element 38. A large degree of overlap as shown in Fig. 4 will require a relatively long time interval before the switch is opened while a shorter overlap will proportionally decrease such interval. Adjustment of this interval is attained by positioning the movable member 25 relative to the frame 10 as previously described. To facilitate this adjustment, the frame member 17 is provided with a circular opening 58, as may be observed in Figs. 1, 8 and 9. Opposite this opening 58 is a second opening 59 of elongated configuration formed in the movable member 25. In order to adjust the movable member 25 relative to the flange 17, a wrench such as the wrench 60 of Fig. 9 may be employed. This wrench is generally in the form of a cylindrical member having an outside diameter approximately equal to the diameter of the opening 58. One end of the wrench includes an eccentric cylindrical extension 61 having a diameter equal to the width of the slot 59. When the wrench is inserted in the opening 58 with the pin 61 in engagement with the slot 59, rotation of the wrench will move the member 25 relative to the bracket member 17 as shown in Figs. 8 and 9 so that the delay imparted by the switch can be adjusted within predetermined limits.

While the switch as described above may be used in a variety of applications, one application is shown in Fig. 10 of the drawings for the control of oil-burning equipment. The switch is shown in diagrammatic form, and the numerals used in identifying the elements of the switch in preceding figures have been used to denote corresponding elements of the switch in Fig. 10.

In the application shown in Fig. 10, an operating voltage is connected to the terminals 62 and 63, and this voltage is applied to the primary of the transformer 64 and to a pair of terminals 65 and 66 for the operation of the oil burner. The connection from the terminal 63 to the terminal 65 is controlled by the contacts 67 of relay 68. The coil 69 of relay 68 has one end connected directly to the secondary of the transformer 64 while the other terminal of the relay coil is connected through a thermostat 70, the contacts 23' and 24' of the switch, and the resistor 42, to the other side of the secondary winding of transformer 64. In addition, the contacts 23' and 24' and the resistor 22 are bridged by a parallel circuit including a pair of contacts 71 operated by a bimetallic element 72, such as a stack switch, responsive to heat generated by the oil burner. With this arrangement, when the thermostat 70 operates to close the circuit, the relay 68 will be operated through the normally closed contacts 23', 24' and the resistor 42 of the reset switch. Operation of the relay closes the contacts 67 and applies energy to the terminals 65 and 66 to operate the oil burner. If the oil burner starts in a normal manner, heat will be generated within the furnace or boiler, and this heat will operate the bimetallic element 72 to close the switch 71. In so doing, the circuit through the reset switch is by-passed, and the burner will continue to operate. If the burner fails to start, the switch 71 will remain open, and the resistor 42 will constantly increase in temperature. This will heat the elements 37 and 38 and cause the leg part 45 of the element 38 to move away from the switch and break the circuit as previously described.

It will be observed that, with the use of a negative temperature co-efficient resistor as the resistor 42, the resistance will decrease as the temperature of the resistor increases, and this action affords a highly accurate and precise switch operation so that with a predetermined setting of the switch, uniform, dependable operation will be insured for long periods of time. Moreover, by adjusting the value of the resistor so that the current through the relay is below the critical operating current, a beneficial delay in relay operation will be produced that will protect the relay and burner against sudden current pulsations caused by chattering of thermostat contacts or other causes.

While only one embodiment of the invention has been illustrated and described, it is apparent that changes, modifications and alterations may be made without departing from the true scope and spirit thereof.

What is claimed is:

1. An electric switch comprising a frame member, at least two contact-carrying members pivotally mounted on said frame for movement in a plane generally at right angles to the plane of movement of said contact members upon operation from an open to a closed position, a bimetallic contact-controlling member operable to hold said contacts in one position and heating means for deflecting said bimetallic member away from said contact-carrying members in a plane generally at right angles to the plane of movement of said contact members to permit them to move to another position, said contact members being movable toward and away from said controlling member to vary the operating characteristics of the switch.

2. An electric switch comprising a frame member, at least two contact-carrying members pivotally mounted on said frame for movement in a plane generally at right angles to the plane of movement of said contact members upon operation from an open to a closed position, a bimetallic contact-controlling member operable to hold said contacts in one position and heating means for deflecting said bimetallic member away from said contact-carrying members to permit them to move to another position, said bimetallic member including a U-shaped element having one leg secured to said frame, an L-shaped element engaging at least one contact-carrying member and supported by the other leg of said U-shaped element with said heating means disposed therebetween, said contact-carrying members being movable toward and away from said controlling member to vary the operating characteristics of the switch.

3. An electric switch according to claim 2, including manually operated means for returning said contacts to said one position after deflection and return of said bimetallic member.

4. An electric switch according to claim 2, wherein said heating means is a resistor having a negative temperature co-efficient of resistance.

5. An electric switch comprising a frame member, a bar member pivotally secured to said frame member, one of said members having a first opening therein, the other member having a second elongated opening therein registering with the first opening and having its shortest dimension less than the dimension of the first opening, said openings being adapted to receive a rotary tool for moving said bar relative to said frame about said pivot, contact-carrying members secured to said bar and movable therewith, a bimetallic element cooperating with said contact-carrying members to hold them in one position and means for heating said element to move the latter out of engagement with said contact-carrying members to permit them to move to another position, said element being movable in the plane of movement of said bar, whereby displacement of the bar will modify the operating characteristics of the switch.

6. An electric switch according to claim 5, wherein said heating means includes a negative temperature co-efficient resistor and said switch further comprises means for manually returning said contacts to said one position after displacement and return of said element.

7. An electric switch comprising a frame, at least two cooperating contact-carrying members for controlling an electric circuit, pivotally mounted means on said frame for holding said contact-carrying members, a heat responsive element for engaging one of said contact members in one position and operable to move free of one contact member to permit movement thereof to another position, said contact-carrying members being movable toward and away from said element to adjust the operating characteristics of said switch, said frame including a circular opening and said pivotally mounted means includes a bar pivotally mounted on said frame and having an elongated opening therein registering with said circular opening in said frame, said openings being adapted to receive an eccentric rotary tool for moving said bar relative to said frame.

8. A switch having a relatively fixed frame, a bimetallic member carried by the frame for movement in one direction in response to temperature rise, and including a pair of reversed bimetallic elements which compensate for change in ambient temperature, an electric heater for said bimetallic member, a frame-carried contact-supporting member, a pair of switch contacts carried by the contact-supporting member and biased to normal relative circuit-controlling position, one of the contacts having a latching relation with the bimetallic member to latch the contacts in the other circuit-controlling position when the bimetallic member is cold, whereby a predetermined circuit relation of the contacts is maintained, and means for adjustable positioning of the contact-carrying member to vary the extent of movement of the bimetallic member upon rise in temperature to unlatch the contacts and allow the switch to return to normal position.

9. A switch having a relatively fixed frame, a bimetallic member by the frame for movement in one direction in response to temperature rise, an electric heater for said bimetallic member, a frame-carried contact-supporting member pivoted to said frame for movement at right angles to the direction of movement of said bimetallic member, a pair of switch contacts carried by the contact-supporting member and biased to normal relative circuit-controlling position, one of the contacts having a latching relation with the bimetallic member to latch the contacts in the other circuit-controlling position when the bimetallic member is cold, whereby a predetermined circuit relation of the contacts is maintained, and means for adjustable positioning of the contact-carrying member to vary the extent of movement of the bimetallic member upon rise in temperature to unlatch the contacts and allow the switch to return to normal position.

10. An electric switch comprising a frame member, at least two contact-carrying members pivotally mounted on said frame for movement in a plane generally at right angles to the plane of movement of said contact members upon operation from an open to a closed position, a bimetallic contact-controlling member operable to hold said contacts in a closed position, heating means for deflecting said bimetallic member away from said contact-carrying members and permit them to move to the open position, said contact-carrying members being movable toward and away from said controlling member to vary the operating characteristics of the switch, and reciprocable spring-loaded contact-resetting means carried by said frame, the last said means being movable in one direction against the action of said spring to displace both contact-carrying members in the open position beyond the point of engagement with said bimetallic member, said contact-carrying members, upon release of said resetting means, moving into engagement with said bimetallic member to close said contacts.

References Cited in the file of this patent

UNITED STATES PATENTS

| 1,527,645 | Hall | Feb. 24, 1925 |
| 1,960,408 | Brach | May 29, 1934 |
| 2,198,358 | Vaughan | Apr. 23, 1940 |
| 2,237,262 | Miller | Apr. 1, 1941 |
| 2,610,273 | Judson | Sept. 9, 1952 |

FOREIGN PATENTS

| 92,330 | Sweden | May 17, 1938 |
| 214,715 | Switzerland | Aug. 16, 1941 |
| 651,051 | Great Britain | Mar. 7, 1951 |
| 721,435 | Great Britain | Jan. 5, 1955 |

UNITED STATES PATENT OFFICE
CERTIFICATE OF CORRECTION

Patent No. 2,860,211                            November 11, 1958

Ralph W. De Lancey et al.

It is hereby certified that error appears in the printed specification of the above numbered patent requiring correction and that the said Letters Patent should read as corrected below.

Column 7, line 3, for "of one" read -- of said one --.

Signed and sealed this 17th day of February 1959.

(SEAL)
Attest:

KARL H. AXLINE

Attesting Officer

ROBERT C. WATSON
Commissioner of Patents